(No Model.)

M. C. THOMAS.
AUTOMATIC CHECKER FOR CORN PLANTERS.

No. 355,802. Patented Jan. 11, 1887.

Witnesses:
R. H. Orwig
C. D. Hudgens

Inventor:
Michael C. Thomas
By Thomas G. Orwig, Atty.

UNITED STATES PATENT OFFICE.

MICHAEL C. THOMAS, OF ADEL, ASSIGNOR OF THREE-FOURTHS TO THOMAS L. WYNNE AND GEORGE C. BRIGGS, BOTH OF WINTERSET, IOWA.

AUTOMATIC CHECKER FOR CORN-PLANTERS.

SPECIFICATION forming part of Letters Patent No. 355,802, dated January 11, 1887.

Application filed July 31, 1886. Serial No. 209,612. (No model.)

*To all whom it may concern:*

Be it known that I, MICHAEL C. THOMAS, a citizen of the United States, residing at Adel, in the county of Dallas and State of Iowa, have invented an Improved Check-Row Corn-Planter, of which the following is a specification.

My invention relates to that kind of machines in which a rectilinear and intermittent motion is imparted to the seed-slide by means of the rotary motion of a wheel that travels on the ground, as required to simultaneously drop seeds at equidistances apart in parallel rows to produce check-rows.

Figure 1:
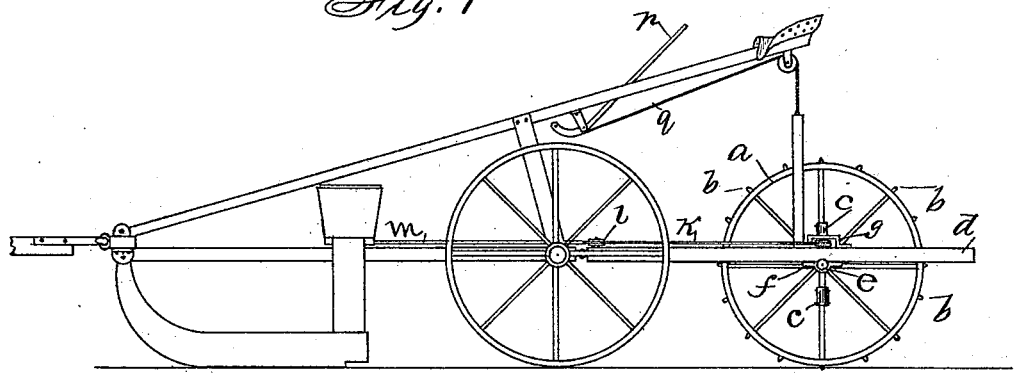
Figure 2:
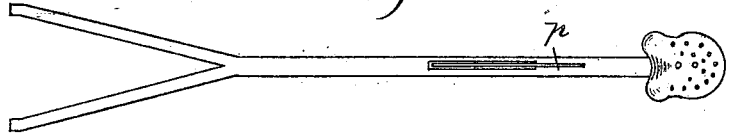
Figure 3:
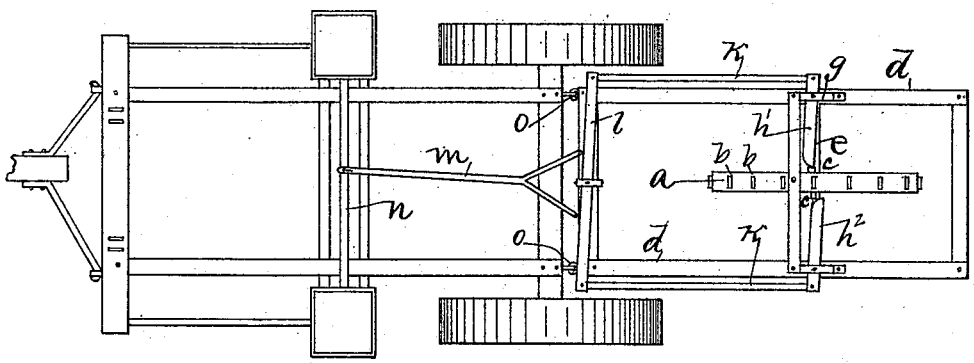

Figure 1 is a side view of the complete machine; Fig. 2, a top view of the seat and pole with elevating-lever attached; Fig. 3, a top view of the complete machine.

$a$ is a traction-wheel, with spurs $b$ on its tire to prevent slipping over the surface of the ground, and with two lugs, $c$, clamped upon opposite spokes, which wheel $a$ is centrally located in the rectangular frame $d$ upon the axle $e$, which has its bearings $f$ bolted to the frame $d$. On the frame $d$, above the bearings $f$ of the axle $e$, are fastened the bearings $g$, which support the vibrating arms $h$. The arms $h$ are connected by means of the rods or bars $k$ to the ends of the vibrating bar $l$, which is pivoted at its center to the front bar of the frame $d$. To the bar $l$ is hinged the oscillating arm $m$, which extends forward and is pivoted to the center of the connecting-rod $n$ of the dropping-plates of the seed-boxes. The frame $d$ is hinged to the axle or frame of the planter by means of hinges $o$, which permit the frame $d$, with wheel $a$, to be elevated from the ground by the lever $p$ and chain $q$, thus throwing the dropping mechanism out of gear while turning at the ends or in going to and from the field.

The wheel $a$ is constructed with its semi-circumference equal to the distance between two concentric rows of corn, so that with each semi-revolution the lugs $c$ are carried alternately in contact with the arms $h$, causing them to alternately vibrate backward and forward, and by their connections with the bar $l$ and arm $m$ a laterally-reciprocating movement is transmitted to the bar $n$, with attached dropping-plates.

It will be observed in Fig. 3 that when the inner end of the arm $h'$ is forced forward by the lug $c$ the outer end is forced backward, drawing on the pivoted rod $k$ and bar $l$, which simultaneously throws the arm $m$ to the right, with the attached rod $n$, which throws the dropping-plates and drops the seed at the instant. In this position the mechanism is ready for the lug $c$ on the opposite side of the wheel $a$ and on a diametrically-opposite spoke to strike arm $h^2$ and reverse the movement of the dropping-plates. This alternate movement of the arms $h$, through the connecting mechanism, imparts a regular reciprocatory movement to the droppers, as required in depositing the seed at equal spaces from each other.

The arm $m$ is forked at its rear end and the branches hinged to the pivoted bar $l$ in such a manner that the arm and bar will be jointly vibrated horizontally when in operation, and the bar $l$ readily elevated to a higher plane as the hinged frame, to which it is pivoted, is lifted to make the dropping mechanism inoperative. The front end of the arm $m$ is attached to the center of the seed-slide or rod $n$ in such a manner that the said rod and valves or plates attached to its ends will remain balanced, as required to prevent binding in its bearings and irregularity in its motions, and by thus transmitting the motion imparted to the pivoted bar $l$ from the wheel $a$, carried in the center of the hinged frame and the center of the complete machine, that is kept balanced by the driver on the seat immediately over the wheel $a$, a regularity of motion is maintained by the various parts of the dropping mechanism that prevents irregularity of space between the points where the seeds are dropped—a desideratum that is essential in check-row planting-machines.

I am aware that a frame carrying a wheel having cams or lugs projecting laterally has been hinged to one of the rear corners of a planter carriage-frame, and combined with the seed-slide by means of intermediate operative devices to impart a reciprocating motion to the seed-slide at regular intervals; but my manner of combining a hinged frame carrying a wheel with the frame of the carriage, a vibrating bar pivoted at its center, and a forked arm connected with the center of the seed-slide is novel and advantageous, in that it prevents the side draft and binding and friction incident to transmitting motion from a wheel at one side of the machine.

I claim as my invention—

The frame $d$, hinged to a planter-carriage, the wheel $a$, having lugs $c$, the pivoted arms $h$, the pivoted bar $l$, the connecting-rods $k$, and the forked arm $m$, connected with the rod or seed-slide $n$, arranged and combined substantially as shown and described, for the purposes stated.

MICHAEL C. THOMAS.

Witnesses:
 JONAS STEVER,
 J. B. BRENTON.